US011991528B2

(12) United States Patent
Kimberly

(10) Patent No.: US 11,991,528 B2
(45) Date of Patent: May 21, 2024

(54) SPATIAL WEB OF TRUST KEY INITIALIZATION METHOD FOR SENSOR PLATFORM ARRAY USING DIRECTED CLOSE-FIELD COMMUNICATION

(71) Applicant: The Boeing Company, Chicago, IL (US)

(72) Inventor: Gregory A. Kimberly, Seattle, WA (US)

(73) Assignee: The Boeing Company, Chicago, IL (US)

( * ) Notice: Subject to any disclaimer, the term of this patent is extended or adjusted under 35 U.S.C. 154(b) by 389 days.

(21) Appl. No.: 17/568,220

(22) Filed: Jan. 4, 2022

(65) Prior Publication Data

US 2022/0225107 A1 Jul. 14, 2022

Related U.S. Application Data

(60) Provisional application No. 63/136,012, filed on Jan. 11, 2021.

(51) Int. Cl.
| | |
|---|---|
| *H04W 12/60* | (2021.01) |
| *G05D 1/00* | (2006.01) |
| *H04W 4/38* | (2018.01) |
| *H04W 12/65* | (2021.01) |
| *H04W 12/71* | (2021.01) |

(Continued)

(52) U.S. Cl.
CPC ............ *H04W 12/66* (2021.01); *G05D 1/104* (2013.01); *H04W 4/38* (2018.02); *H04W 12/65* (2021.01); *H04W 12/71* (2021.01); *H04W 76/14* (2018.02); *H04W 76/15* (2018.02); *H04W 84/06* (2013.01)

(58) Field of Classification Search
CPC .............. H04W 4/38; H04W 4/50–80; H04W 76/14–15; H04W 84/06; G05D 1/104
See application file for complete search history.

(56) References Cited

U.S. PATENT DOCUMENTS

| 9,542,850 B2 * | 1/2017 | Kantor ................. G06Q 10/083 |
| 9,646,502 B1 | 5/2017 | Gentry |

(Continued)

OTHER PUBLICATIONS

Gatewood, Hunter C.; Scalable Key Management for Tactical Swarms; Chapters 5, 8 and 9; May 24, 2019, https://dspace.mit.edu/bitstream/handle/1721.1/123141/1128823189-MIT.pdf?sequence=1&isAllowed=y.

*Primary Examiner* — San Htun
(74) *Attorney, Agent, or Firm* — Quinn IP Law

(57) ABSTRACT

A method initializes a spatial web of trust for a sensor platform array by positioning multiple sensor groups within a restricted workspace, such that adjacent sensor platform pairs are formed from corresponding platforms of the groups within a close-field range. Sensor-specific identification keys are exchanged between respective adjacent sensor platforms, with the groups progressively repositioned to form unique adjacent sensor platform pairs within the close-field range. The method includes progressively exchanging the keys until each platform has exchanged a respective key with every other platform in the array, thereby initializing the spatial web of trust. A system for initializing the spatial web of trust for a UAV swarm includes the UAV swarm in communication with a base station over an encrypted communications link. Each UAV includes a CPU, a sensor suite, and memory on which is recorded instructions for the method.

20 Claims, 5 Drawing Sheets

(51) Int. Cl.
    *H04W 76/14*     (2018.01)
    *H04W 76/15*     (2018.01)
    *H04W 84/06*     (2009.01)

(56) References Cited

U.S. PATENT DOCUMENTS

| | | | |
|---|---|---|---|
| 2016/0225264 A1* | 8/2016 | Taveira | G08G 5/0013 |
| 2018/0218619 A1* | 8/2018 | Brown | G08G 5/0013 |
| 2020/0076495 A1* | 3/2020 | Martinerie | H04B 7/18504 |
| 2021/0088337 A1* | 3/2021 | Koubaa | G01C 21/20 |
| 2021/0209956 A1* | 7/2021 | Allouche | G08G 5/0095 |

* cited by examiner

SPATIAL WEB OF TRUST KEY INITIALIZATION METHOD FOR SENSOR PLATFORM ARRAY USING DIRECTED CLOSE-FIELD COMMUNICATION

CROSS-REFERENCE TO RELATED APPLICATION

The present application claims the benefit of priority to U.S. Provisional Application No. 63/136,012, filed on Jan. 11, 2021, which is hereby incorporated by reference in its entirety.

BACKGROUND

Data encryption is the process of converting data into a scrambled and unintelligible form, commonly referred to in the art as cipher data. Data of various types may be encrypted for storage as well as transmission, with an overarching goal of data encryption ultimately being one of improved security from theft or alteration. Encryption algorithms typically incorporate the use of unique passwords or keys that a recipient of the encrypted data inputs to automatically decrypt the stored or transmitted encrypted data. Common types of encryption include Data Encryption Standard (DES), Triple DES, Advanced Encryption Standard (AES), Rivest-Shamir-Adleman (RSA), and TwoFish, among others.

In the realm of cryptography, a "web of trust" is often used to establish secure networked communication between multiple compatible devices. In general terms, a web of trust is a decentralized trust model often used as an alternative to centralized trust models, such as Public Key Infrastructure (PKI) or another centralized cryptosystem. Unlike PKI, which relies on the use of a highly hierarchical certificate authority, the more informal web of trust provides a decentralized mechanism for determining the validity of public keys. Users of such an approach are thus able to post new identifying keys to other trusted users forming the "web" of the web of trust, with the keys of different users automatically validated during a pairing process when constructing the web.

SUMMARY

The present disclosure relates to methods and systems for initializing a spatial web of trust for a sensor platform array. The sensor platform array may be constructed from an application-suitable number of constituent mobile or stationary sensors in different embodiments, such as but not limited to an airborne, seaborne, or terrestrial drone swarm or a fixed array of sensor platforms. As used herein, the term "sensor" broadly encompasses any device capable of detecting or otherwise receiving inputs and responding thereto in a controlled manner, including autonomous control scenarios as described herein. Representative embodiments of sensors mountable on a given sensor platform include lidar or radar sensors, electrooptical, infrared, ultraviolet, or multi-spectral cameras, global positioning system (GPS) receivers, inertial sensors, temperature, moisture, and/or windspeed sensors, microphones, intelligent lighting devices, transceivers, light-emitting devices, and the like, depending on the particular application. The sensor array may be constructed of like or different types of sensors, again depending on the application.

An embodiment of the present method includes arranging the sensor platform array in multiple groups of sensor platforms ("sensor groups") within a restricted workspace. In this manner, adjacent sensor platform pairs are formed from corresponding sensor platforms of each respective one of the sensor groups. This occurs within a predetermined or non-predetermined close-field range as described in detail below, with the close-field range typically being less than 1 meter (m) to about 50 m depending on the application and size of the sensor platforms in use. The method in this embodiment includes exchanging sensor-specific identification keys between the adjacent corresponding sensor platforms, with such a key exchange occurring using respective signal transceivers of the respective sensor platforms.

The method further includes progressively repositioning the multiple sensor groups to form unique adjacent sensor platform pairs within the predetermined or non-predetermined close-field range. In response such repositioning, the keys are progressively exchanged until each sensor platform of the array has exchanged a respective one of the keys with every other sensor platform in the array, thereby initializing the spatial web of trust.

Each sensor platform may be mounted on a respective mobile drone in some configurations, with the sensor platform array in such an embodiment that it constitutes a drone swarm. A drone swarm in a disclosed exemplary embodiment is an aerial drone swarm constructed of unmanned aerial vehicles (UAVs), although land-based and surface or subsurface water-based drone swarms may also be contemplated within the scope of the present disclosure.

The restricted workspace in the UAV swarm embodiment forms a three-dimensional airspace, such as a 10 meter (m)×10 m×10 m, or 20 m×20 m×20 m, or 100 m×100 m×100 m restricted three-dimensional airspace in non-limiting exemplary setups. Arranging the array or the sensor groups thereof may include, in such an embodiment, autonomously or semi-autonomously controlling flight operations of the UAV swarm within the three-dimensional airspace. Controlling the flight operation of the UAV swarm includes transmitting flight control instructions to the UAV swarm from a terrestrial base station over a ground-to-air communications link.

Controlling flight operations of the UAV swarm may itself includes executing a set of non-local or local instructions using a respective processor or central processing unit of each of a plurality of UAVs, which would enable autonomous control of the flight operations of the collective UAV swarm. Alternatively, controlling flight operations could entail directing the flight operations from a terrestrial or airborne base station in real-time, e.g., using a secure/encrypted or unencrypted radio and/or optical communications link.

Arranging the sensor groups of the array within the restricted workspace may include arranging sensor platforms of each of the multiple sensor groups around a respective annular perimeter, and thus in separate quasi-circular formations. In such an approach, arranging the multiple sensor groups includes counter-rotating the sensor groups around the respective perimeters to sequentially form the unique adjacent sensor platform pairs, as well as subdividing and counter-rotating each of the multiple sensor groups in response to detection of a duplicate adjacent sensor platform pair, i.e., a pair of the sensor platforms for which the sensor-specific identification keys were previously exchanged, and subdividing and counter-rotating each of the multiple sensor groups in response to detecting the duplicate adjacent sensor platform pair.

Arranging the sensor platforms around the respective perimeters of the quasi-circular formations may include, according to an alternative approach, arranging the sensor platforms on different physical turntables, e.g., rotary plates or another suitable support structure. Positioning the sensor groups in this particular embodiment thus includes counter-rotating the different turntables, for example using a corresponding drive torque from a respective electric motor. The method in such an embodiment includes detecting a completed exchange of the above-noted keys between the respective sensor platforms of the adjacent pairs, and then counter-rotating the turntables automatically via an electronic control unit using the drive torques in response to the completed exchange.

Also disclosed herein is a system for initializing a spatial web of trust for an autonomous unmanned aerial vehicle (UAV) swarm. The system includes a base station and the UAV swarm, with the UAV swarm being in communication with the base station over a communications link. The communications link is at least one of an air-to-air communications link or a ground-to-air communications link. Each respective UAV of the UAV swarm includes a central processing unit (CPU), a sensor suite, and memory on which is recorded instructions. Execution of the instructions by the CPU, in response to an initiation signal from the base station, causes an autonomous arranging of multiple autonomous UAV groups of autonomous UAVs of the UAV swarm within a restricted airspace. An adjacent UAV pair is thereby formed from a corresponding UAV of each respective one of the multiple UAV/sensor groups within a predetermined or non-predetermined close-field range.

In this embodiment, execution of the instructions causes an exchange of UAV-specific identification keys between respective UAVs of the adjacent UAV pairs using respective transceivers of the respective UAVs, the transceivers being at least one of radio transceivers or optical transceivers, along with progressive repositioning of the UAV groups, via control of a flight operation of the UAV swarm, which may occur autonomously, using the communications link with the base station, or both. Doing this forms unique adjacent UAV pairs within the predetermined or non-predetermined close-field range. In response to the repositioning, the same instructions cause progressive exchanging of the UAV-specific identification keys. This continues until each UAV of the UAV swarm has successfully exchanged a respective one of the UAV-specific identification keys with every other UAV in the UAV swarm, thereby initializing the spatial web of trust.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
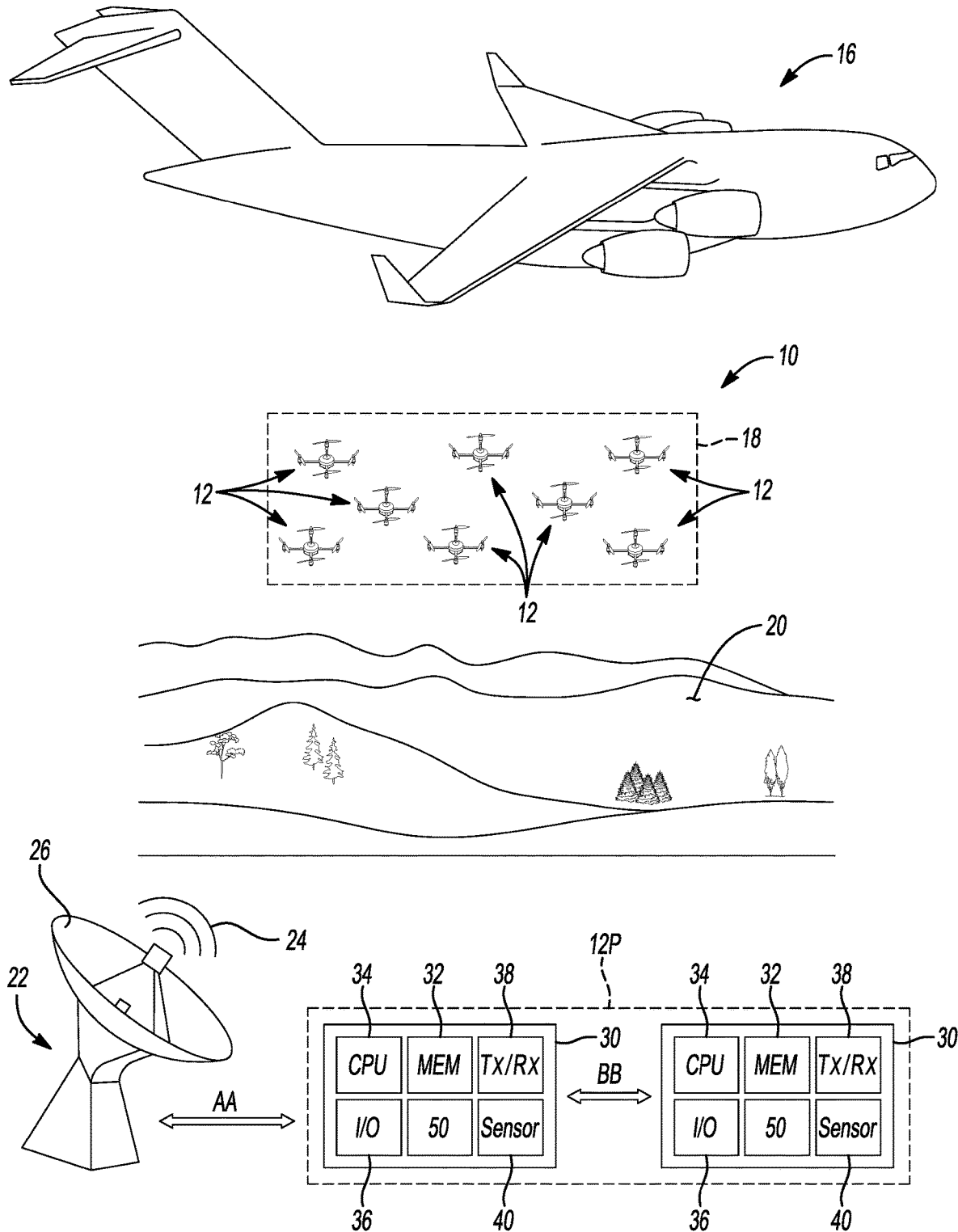
FIG. 1 is a schematic illustration of a representative sensor platform array in the exemplary form an unmanned aerial vehicle swarm, the individual sensor platforms of which form a spatial web of trust that is initialized in accordance with the method described herein.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover alternatives falling within the scope of the disclosure as defined by the appended claims.

DETAILED DESCRIPTION

Embodiments of the present disclosure are described herein. It is to be understood, however, that the disclosed embodiments are merely examples, and that other embodiments can take various and alternative forms. The Figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as "above" and "below" refer to directions in the drawings to which reference is made. Terms such as "front," "back," "fore," "aft," "left," "right," "rear," and "side" describe the orientation and/or location of portions of the components or elements within a consistent but arbitrary frame of reference, which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Referring to the drawings, wherein like reference numbers refer to the same or like components in the several Figures, a representative sensor platform array 10 is shown schematically in FIG. 1, with the sensor platform array 10 having a plurality of sensor platforms 12. Collectively, the sensor platform array 10 acts as a spatial web of trust within the scope of the present disclosure, with the individual sensor platforms 12 operating autonomously in the performance of a particular mission task.

As used herein and in the art, particularly with respect to networked cryptography, a web of trust is often used as a decentralized trust model in lieu of a more centralized public key infrastructure, better known as PKI. In general, each member of a web of trust must first be made aware of every other member's corresponding identification key. Communication between any two members in a given sender-recipient pairing thus involves encryption by the sensor of the particular data with the recipient's unique identification key. The recipient alone is thus configured to decrypt the transmitted encrypted data. For communication to occur reliably and seamlessly in a web of trust framework, therefore, each member of the web of trust must be made aware of the corresponding identification keys of every other member. To this end, the present disclosure provides directed-field solutions to the challenge of populating the web of trust via the orchestrated exchange of such identification keys.

While the individual sensor platforms 12 are depicted in FIG. 1 as unmanned aerial vehicles (UAVs) or other pilotless aerial drones, and thus the sensor platform array 10 is embodied as a representative drone/UAV swarm as set forth herein, those skilled in the art will appreciate that other types of sensor platform arrays 10 and constituent sensor platforms 12 may be envisioned within the scope of the present disclosure. For instance, the individual sensor platforms 12 need not be mobile, but rather could be configured as any number of stationary platforms for use with sensors 40 such as cameras, microphones, thermal sensors, intelligent lighting devices, weather sensors, transponders, lidar sensors, radar sensors, and the like, depending on the particular application.

Likewise, various other mobile applications may be readily envisioned in which the sensor platforms 12 are deployed on tracked or wheeled terrestrial surface vehicles, propeller or jet-powered surface or subsurface watercraft, or in operating environments other than the representative airborne application of FIG. 1. Solely for illustrative consistency, however, the sensor platform array 10 and sensor platforms 12 will be described hereinafter as a UAV swarm 10 and UAVs 12, respectively, without limitation.

As appreciated in the art, missions ranging in scope from package delivery to the monitoring of traffic, search and rescue operations, atmospheric weather patterns, or difficult to access locations and/or remote infrastructure entails a broad range of data collection capabilities. Reliable collection, distribution, and consumption of collected data thus requires carefully coordinated data collection from multiple points-of-origin over an associated communication network. In some cases, backhaul capabilities are used to distribute collected data to a remotely located end user, often using satellite or ground-based relays to facilitate the backhaul capability. Such backhaul capabilities may be lost or rendered temporarily unavailable due to a host of possibly manmade and natural factors. The use of a UAV swarm such as the depicted UAV swarm 10 of FIG. 1 may be used to advantage in such backhaul-deprived environments, as well as in operating environments in which such capabilities remain intact.

In the non-limiting aerial scenario illustrated in FIG. 1, the UAV swarm 10 is deployed from an aircraft 16, such as from a payload bay door (not shown). For instance, the aircraft 16 could fly to a predetermined or non-predetermined rendezvous location at a predetermined or non-predetermined mission-suitable altitude. Once arriving on station, the aircraft 16 could deploy the UAV swarm 10, at which point each UAV 12 autonomously engages in a collectively-coordinated mission. In such a use scenario, the UAVs 12 could each collect sensor-specific data and relay the collected data back to the orbiting aircraft 16, or each UAV 12 could perform an individually assigned mission task in close cooperation with the other UAVs 12 in the collective UAV swarm 10.

Figure 2:
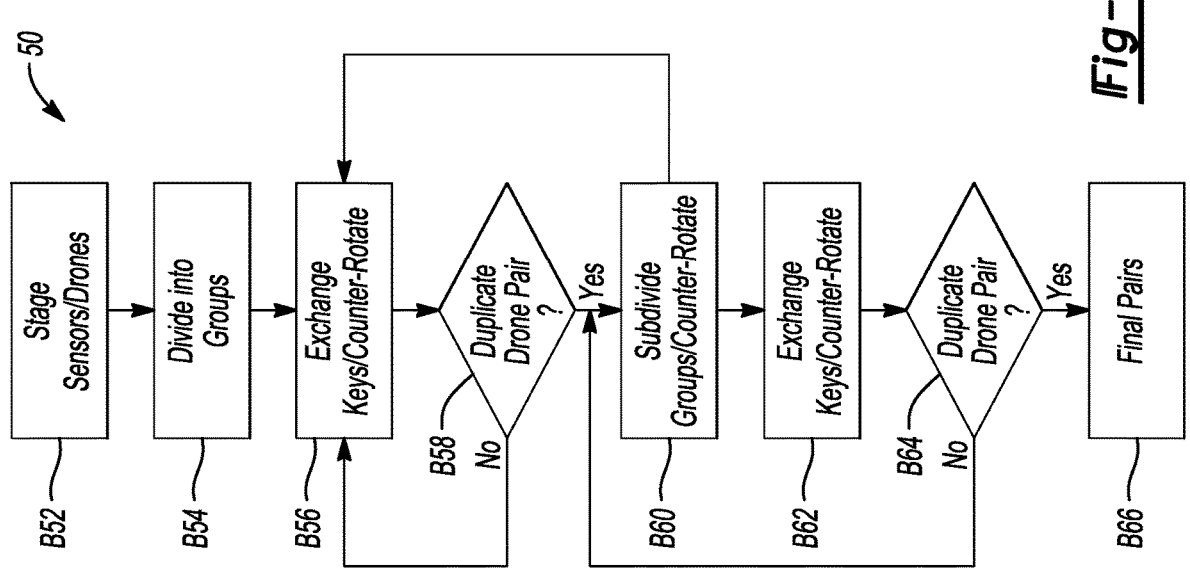
FIG. 2 is a flow chart describing an exemplary embodiment for implementing the present method.

To function as a cohesive unit in such a use scenario, the UAV swarm 10 is first constituted as an exclusive spatial web of trust in accordance with the present disclosure. Accordingly, each UAV 12 is pre-populated with unique sensor-specific identification keys of each of the other member UAVs 12 in the UAV swarm 10. The present approach offers a particular solution to the problem of accurate and efficient key initialization in the context of establishing the web of trust. The present method 50, an embodiment of which is described below with reference to FIG. 2, is useful not only within the context of the exemplary UAV swarm 10 shown in FIG. 1, but also for mobile or stationary sensor platform arrays of other types, as noted above.

In the non-limiting embodiment of FIG. 1, the UAV swarm 10 is shown positioned within a restricted workspace 18. As used herein, the term "restricted workspace" may entail a three-dimensional application-suitable airspace in which the UAVs 12 are isolated or set a sufficient distance apart from other signal-emitting devices, and thus are protected from electromagnetic interference or signal interception during the course of executing the present method 50. The size of the restricted workspace 18 varies with that of the individual UAVs 12, with the depicted size not necessarily shown to scale.

By way of example and not limitation, the restricted workspace 18 for the illustrated airborne-deployed UAV swarm 10 in which each member UAV 12 has a wingspan of about 1 meter (m) may be on the order of 10 m×10 m×10 m to 20 m×20 m×20 m. The actual size of the restricted workspace 18 is highly scalable to other sizes and types of UAVs 12, e.g., fixed-wing drones or gliders, or rotary configurations other than the non-limiting quadcopter embodiment shown in FIG. 1. An altitude of the restricted workspace 18 likewise depends on the mission/application, with variations being possible depending on whether the UAVs 12 are deployed at altitude in proximity to the restricted workspace 18 from the aircraft 16 while the aircraft 16 is in flight, or instead launched from a surface 20, e.g., a ground surface as depicted in FIG. 1, with water surface-based launches likewise possible within the scope of the disclosure.

An optional base station 22 may be used to transmit mission or flight operations instructions 24 over an encrypted or unencrypted communications link via a directional or omni-directional antenna 26 to one or more of the UAVs 12 when executing the present method 50. Such signal transmission is represented by double-headed arrow AA in FIG. 1. The base station 22 could be a stationary or mobile facility located on the ground surface 20, with such a base station 22 referred to as a terrestrial base station 22 in such an embodiment, or the base station 22 could be an airborne base station 22 present aboard/integrated with the aircraft 16 in different embodiments. Fully-autonomous embodiments may also be envisioned in which each UAV 12 is programmed in software and equipped in hardware to execute corresponding instructions for implementing the present method 50. That is, the UAVs 12 while in flight could individually and cooperatively execute the method 50 so as to move in a well-choreographed manner within the restricted workspace 18, as set forth in detail below with reference to FIGS. 3-5, when exchanging sensor-specific identification keys in the course of initializing the above-noted web of trust.

To that end, each UAV 12 of the collective UAV swarm 10 shown schematically in FIG. 1 may include a corresponding local controller 30 for a representative UAV pair 12P, i.e., two adjacent aerial UAVs 12 within the above-noted close-field range. Two-way wireless authentication between the local controllers 30 of the UAV pair 12P is represented by double-headed arrow BB. Each local controller 30 is equipped with application-specific amounts of volatile and non-volatile memory (MEM) 32 and a central processing unit (CPU) 34, as well as other associated hardware and software. Exemplary hardware includes input/output (I/O) circuitry 36 and an electro-optical signal transceiver (Tx/Rx) 38, as well as a digital clock or timer, signal buffer circuitry, etc., any or all of which may be embodied as an Application Specific Integrated Circuit (ASIC) or a System-on-a-Chip (SoC) to provide the programmed functionality. Each local controller 30 includes an onboard sensor suite 40, e.g., a discrete sensor or a multitude of sensors, with various embodiments of the sensors 40 described above and understood by those skill in the art. As part of the method 50, each local controller 30 is in close-field communication with a counterpart UAV 12 to form the UAV pair 12P when a pair of the UAVs 12 are positioned within a close-field range of each other.

Turning now to FIG. 2, a representative embodiment is shown for implementing the present method 50 when initializing a spatial web of trust with a suitable sensor array. In keeping with the non-limiting UAV swarm 10 of FIG. 1, the method 50 assumes availability of a suitably equipped population of UAVs 12, each of which is equipped with flight control logic and avionics (not shown), the sensor(s) 40 of FIG. 1, and other requisite hardware for performing an assigned mission task. Additionally, the memory 32 of FIG. 1 is populated with instructions for executing the method 50, and in particular for enabling the UAV 12 to position itself in accordance with a predetermined or non-predetermined flight plan when maneuvering in free space within the restricted workspace 18.

Commencing with logic block B52, the method 50 in the depicted embodiment entails staging or purposefully arranging the UAVs 12 within the restricted workspace 18 shown in FIG. 1. In a non-limiting exemplary application, for instance, logic block B52 includes deploying the UAV swarm 10 from the aircraft 16, launching the UAVs 12 from the ground surface 20, or otherwise moving the UAVs 12 into the restricted workspace 18. As described below and as shown as an optional restricted workspace 118 in FIG. 6, the restricted workspace need not be an airborne workspace within the scope of the disclosure, i.e., mobile embodiments of the UAVs 12 need not be flown when performing logic block B52. The method 50 proceeds to logic block B54 when the UAVs 12 have been arranged in the restricted workspace 18.

Figure 3:
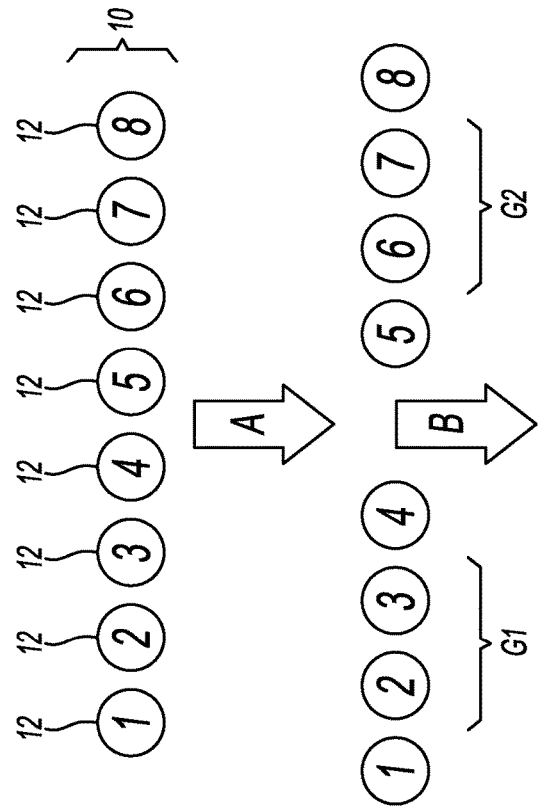
FIGS. 3, 4, and 5 schematically depict a progressive exchange of sensor-specific identification keys in accordance with the present disclosure.
Figure 3:
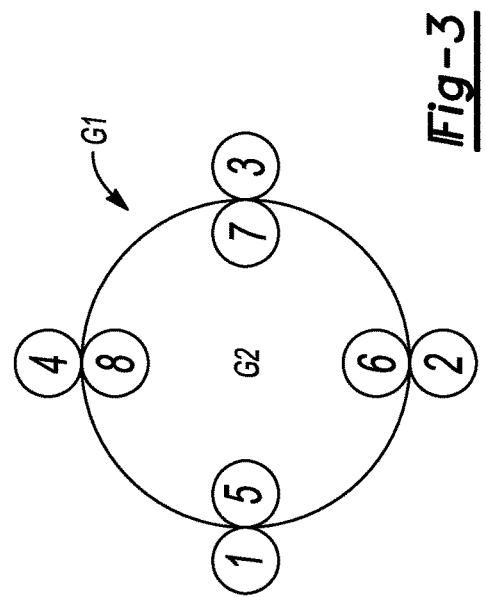
Figure 4:
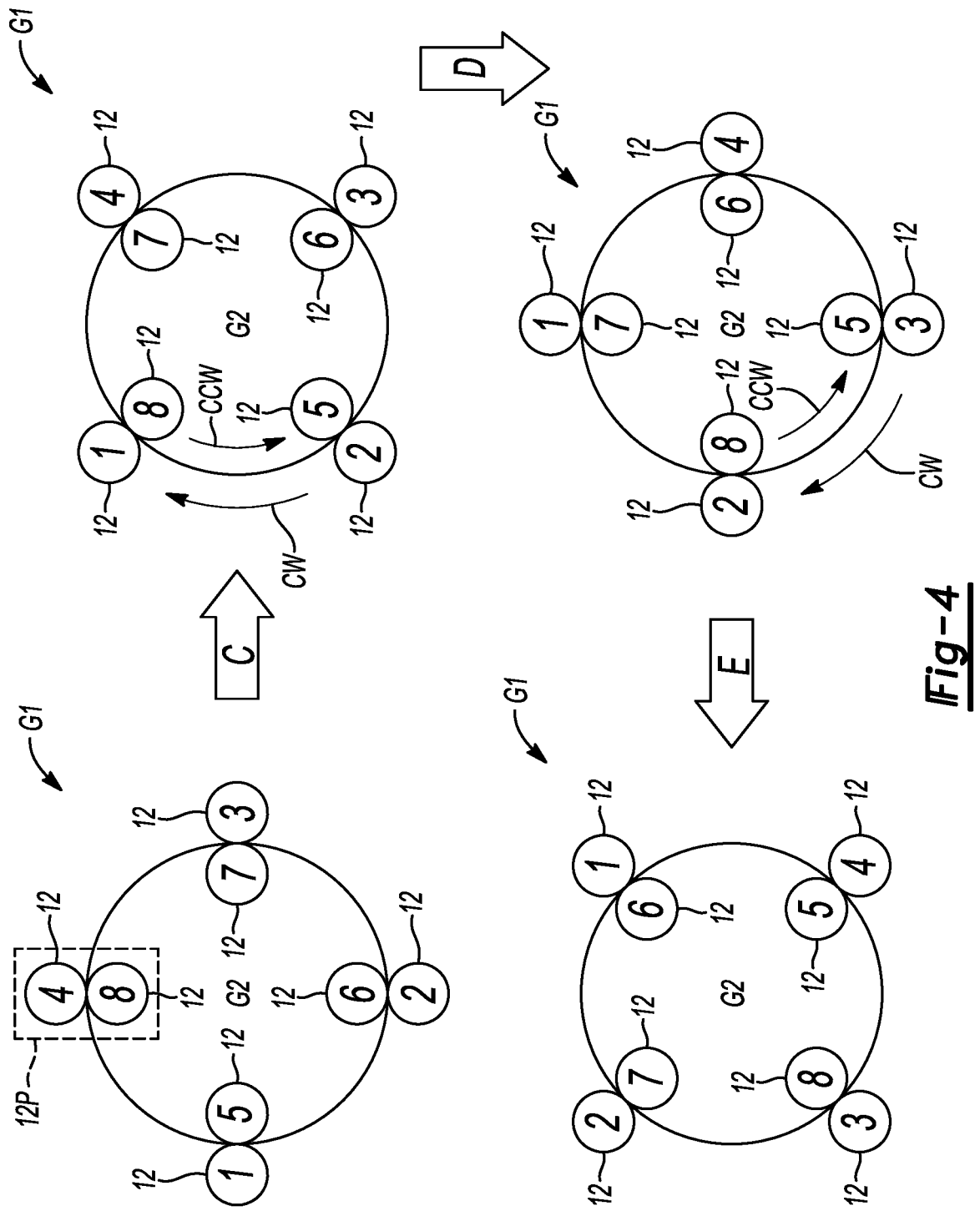
Figure 5:
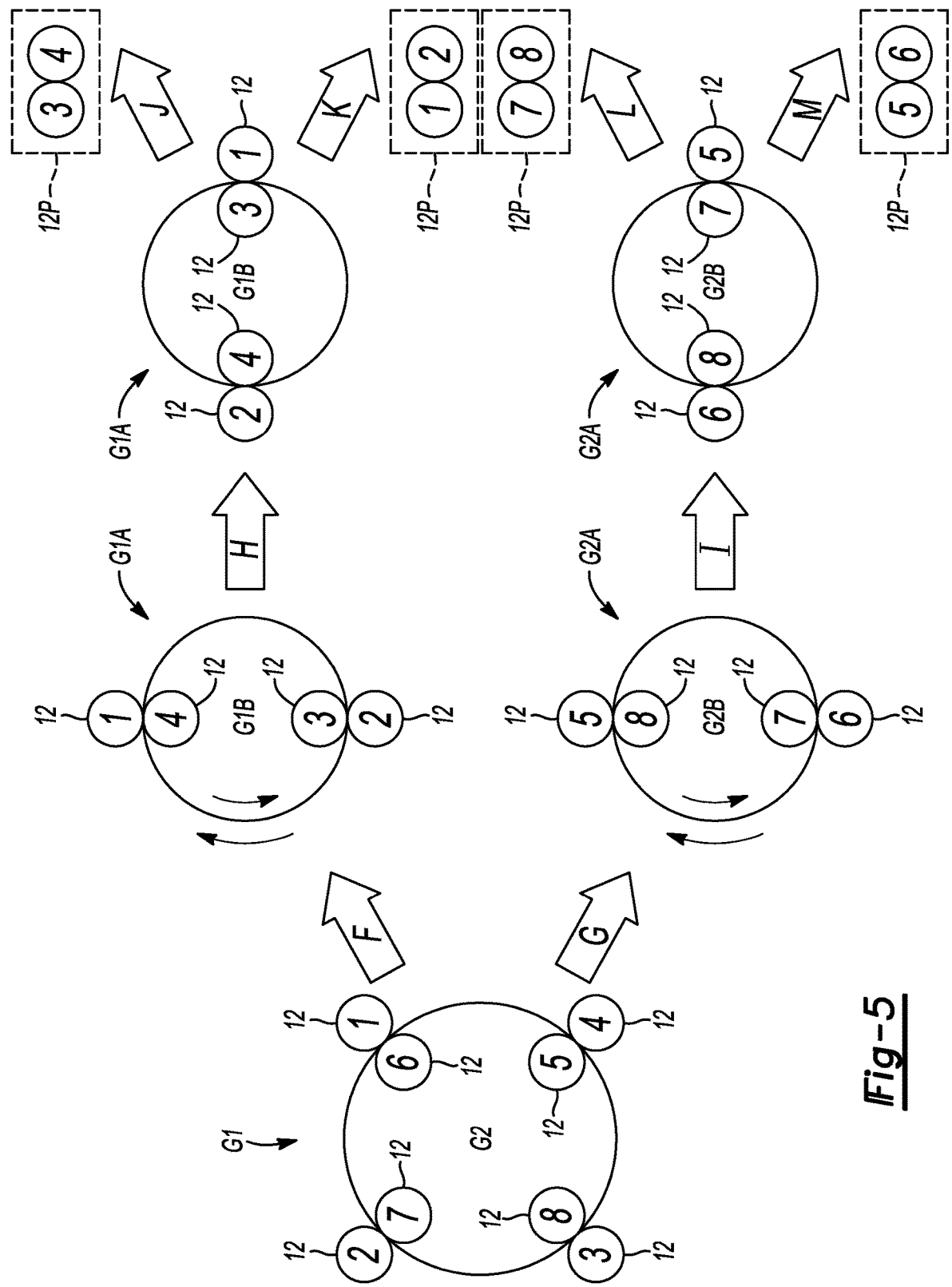

Logic block B54 includes dividing the UAVs 12 into multiple UAV groups G1 and G2 (see FIG. 3), with the UAV groups being one possible type of sensor group within the scope of the disclosure. Such a division is performed regardless of whether the total number of UAVs 12 in the UAV swarm 10 is odd or even. For an odd number, however, the groups G1 and G2 will have a different relative number of UAVs 12, e.g., five and four in a representative nine-UAV population. For simplicity, an even number of aerial UAVs 12 is shown in FIGS. 3-5 as eight UAVs 12, respectively labeled (1), (2), . . . , (8) for clarity.

Logic block B54 of FIG. 2 may entail arranging the UAV swarm 10 or other sensor platform array in the multiple sensor groups, e.g., UAV groups G1 and G2 in a simplified embodiment, within the restricted workspace 18 or 118, such that multiple adjacent sensor UAV pairs 12P are formed within a predetermined or non-predetermined close-field range from adjacent corresponding UAVs 12 of each respective one of the multiple UAV groups G1 and G2. In a particular embodiment, positioning the UAV groups G1 and G2 of the UAV swarm 10 within the restricted workspace 18 of FIG. 1 includes arranging UAVs 12 of each of the UAV groups G1 and G2 around a respective perimeter of separate quasi-circular formations, as best shown in FIGS. 3-5.

Additionally, execution of block B54 includes, in some embodiments, controlling flight operations of the UAV swarm 10 within the restricted workspace 18, in this instance a three-dimensional airspace at an application-suitable altitude above the ground surface 20 shown in FIG. 1. Such positioning occurs within a directed close-field range. As used herein, the term "close-field" refers to an application-specific linear distance in which the transceivers 38 of the UAVs 12 are able to directionally or omni-directionally exchange their respective unique identifying keys in encrypted or unencrypted form when the UAVs 12 are moved or flown into a close-field proximity of one another.

The actual distance of such close-field proximity will be proportionate to the size of the UAVs 12 and the particular frequencies and transmission ranges over which the UAVs 12 communicate. Near-field communication (NFC) ranges of about 35 cm or less could conceivably be used in some embodiments, such as those shown in FIG. 6 in which flight operations are not required. NFC ranges may be particularly useful when using miniaturized UAVs 12 or other diminutive stationary or mobile sensors. Other embodiments may be conceived in which the close-field range is greater than typical NFC ranges, e.g., BLUETOOTH. For example, the close-field range contemplated herein may be on the order of about 1-10 m or 1-50 m in non-limiting exemplary embodiments, or another flight-safe standoff distance that is close enough for performing the method 50 without adversely affecting flight dynamics and safety, while ensuring signal transmission security and integrity.

The application-specific close-range communication protocol used in the course of executing the method 50 may be used in conjunction with different transmission hardware constructions. Directed communications are used to ensure receipt of the exchanged encrypted identification keys only by the UAVs 12 forming a given UAV pair 12P. Thus, the transceivers 38 of FIG. 1 may be provided with an application-suitable antenna geometry, and tuned to provide the required secure transmission range. Techniques such as beam forming may also be used to this end, albeit at the expense of added complexity.

As shown in FIG. 3, the UAV swarm 10 may include eight UAVs 12, nominally labeled (1), (2), (3), (4), (5), (6), (7), and (8) for clarity. Thus, block B54 of FIG. 2 could entail dividing the UAV swarm 10 into two groups of four UAVs 12 in this illustrative embodiment, and then situating each UAV group G1 and G2 adjacent to the other, such that each UAV 12 of group G1 is positioned immediately adjacent to another UAV 12 from group G2. Such positioning is shown schematically in FIG. 3 with UAVs 12 numbered (1), (2), (3), and (4) positioned in one quasi-circular arrangement, and with UAVs 12 numbered (5), (6), (7), and (8) being similarly positioned. UAV groups G1=(1, 2, 3, 4) and G2=(5, 6, 7, 8) are thus roughly concentrically arranged as shown. Such positioning thus ensures an initial pairing arrangement of the UAVs 12 in pairs (4, 8), (3, 7), (2, 6), and (5, 1). Alternatively, groups G1 and G2 may be of any size and are not required to be of equal or close to equal sizes, and are not required to have an equitable initial pairing arrangement. Alternatively, more groups than the illustrated groups G1 and G2 may be defined and positioned adjacent to each other in similar manners.

Attendant actions needed for dividing the UAVs 12 into groups G1 and G2 of FIG. 3 will depend on the construction of the UAVs 12 and the size and location of the restricted workspace 18, as will be appreciated by those skilled in the art. For example, in the non-limiting airborne application of FIG. 1, the UAVs 12 may fly autonomously to the designated restricted workspace 18, or the UAVs 12 may be directed via an analogous air traffic controller, e.g., the base station 22 on the ground surface 20 or aboard the orbiting aircraft 16 of FIG. 1.

Figure 6:
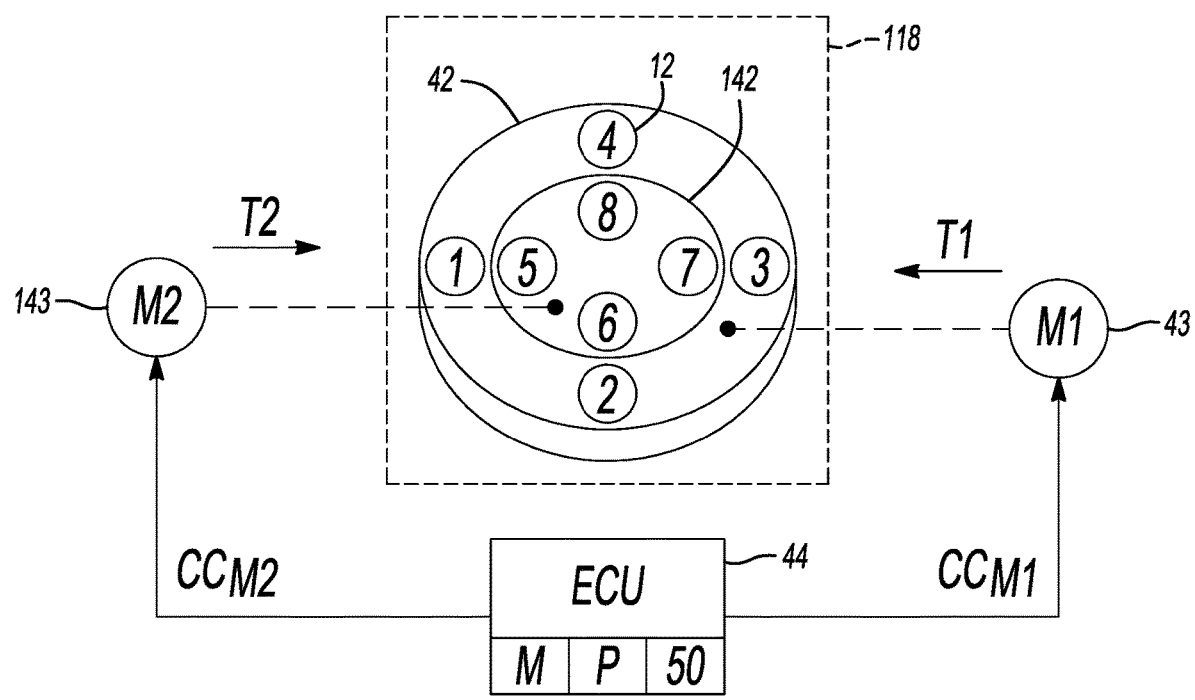
FIG. 6 depicts an alternative mechanical turntable-based embodiment for use with the method of FIG. 2.

Alternatively as shown in FIG. 6, the UAVs 12 may be situated on turntables 42 and 142, whether mechanical or quasi-mechanical. For instance, the turntables 42 and 142 may be configured as large moveable plates or platforms having respective rotational positions controlled by a corresponding electric motor (M1) 43 and (M2) 143. That is, the UAVs 12, rather than being flown as in FIG. 1, may instead be placed in the above-noted quasi-circular pattern around the perimeters of the turntables 42 and 142. An electronic control unit (ECU) 44 having associated memory (M) and a processor (P), analogous to the memory 32 and CPU 34 of FIG. 1, may then execute instructions embodying the method 50 to control positioning and data exchange between the aerial UAVs 12. For example, the ECU 44 may output torque commands (arrows T1 and T2) to the respective electric motors 43 and 143 in response to motor control signals (arrows $CC_{M1}$ and $CC_{M2}$) to cause a corresponding rotation of the turntables 42 and 142 within another restricted workspace 118. Block B54 of FIG. 2 proceeds to block B56 after the two UAV groups G1 and G2 of FIG. 3 have been formed in an application-suitable manner.

Block B56 of the method 50 shown in FIG. 2 includes exchanging sensor-specific identification keys between respective UAVs 12 of adjacent UAV pairs 12P. This action occurs using the transceivers 38 of the respective UAVs 12 (see FIG. 2) and associated communications protocols. After an exchange of sensor-specific identification keys by the UAV pairs 12P, e.g., UAV pairs (4, 8) and (2, 6) in the initial position of FIG. 3, the quasi-circular arrangements are counter-rotated. Such movement is represented in FIG. 4 by arrows CW and CCW, with aerial UAVs or drones 12 labeled (5, 6, 7, 8) rotating counter-clockwise (arrow CCW) and UAVs/drones 12 labeled (1, 2, 3, 4) rotating clockwise (arrow CW) in the depicted embodiment. As appreciated, the relative direction of rotation is immaterial, provided that the two UAV groups G1 and G2 rotate in opposite directions. Counter-rotating the mechanical turntables 42 and 142 in the alternative FIG. 6 embodiment could occur automatically via the ECU 44 in response to the successful exchange.

Block B56 of FIG. 2 proceeds to block B58, with blocks B56 and B58 of the method 50 continuing in a sequential iteration until it is determined at block B58 that a duplicate UAV pair 12P is attempting or will attempt to pair. As used herein, a duplicate UAV pair 12P is a UAV pair 12P having previously exchanged the above-noted UAV-specific identification keys. Thus, method 50 includes progressively repositioning the UAV groups G1 and G2 to form unique adjacent UAV pairs 12P within the predetermined or non-predetermined close-field range noted above.

For example, the illustrated example of FIG. 4 starts out with UAV pairs (1, 5), (2, 6), (3, 7), and (4, 8). The UAV groups G1 and G2 then counter-rotate once, as indicated by arrow C, to form new UAV pairs (1, 8), (2, 5), (3, 6), and (4, 7). Autonomous counter-rotation of the UAV groups G1 and G2 occurs around the respective perimeters of the above-noted quasi-circular arrangements in order to sequentially form the unique adjacent sensor platform pairs.

Following this control action, another counter-rotation (arrow D) occurs to form new UAV pairs (1, 7), (2, 8), (3, 5), and (4, 6). In the same manner, the next counter-rotation (arrow E) results in new UAV pairs (1, 6), (2, 7), (3, 8), and (4, 5). So far in the described counter-rotation sequence, the counter-rotations of arrows C, D, and E produce only new/previously unrecorded pairings. However, were another counter-rotation to be attempted, the resulting relative positions would be the same as the initial set, i.e., UAV pairs (1, 5), (2, 6), (3, 7), and (4, 8). The method 50 thus includes detecting, as a duplicate adjacent UAV pair 12P at block B58, an adjacent sensor pair for which the sensor-specific identification keys were previously exchanged. The method 50 then proceeds to block B60.

Blocks B60 and B62 respectively include subdividing the UAV groups G1 and G2 into UAV sub-groups G1A, G1B and G2A, G2B, respectively, and thereafter repeating the above-described key exchange and counter-rotating of the new sub-groups. As a simplified example, FIG. 5 commences with the ending spatial arrangement of FIG. 4, i.e., with UAV pairs (1, 6), (2, 7), (3, 8), and (4, 5). At block B60, since duplicate UAV pairs would be detected with the next counter-rotation, the method 50 subdivides UAV group G1 and G2, i.e., UAVs/drones 12 labeled (1, 2, 3, 4) and (5, 6, 7, 8).

For example, subdividing the UAVs 12 (1, 2, 3, 4) results in two new subgroups, i.e., UAVs 12 labeled (1) and (2) forming sub-group G1A and UAVs 12 labeled (3) and (4) forming sub-group G1B, as indicated by arrow F. Likewise, subdividing UAVs 12 labeled (5, 6, 7, 8) results in two new sub-groups G2A and G2B, i.e., UAVs/drones 12 labeled as (5, 6) and UAVs/drones 12 labeled as (7, 8), with this subdivision indicated by arrow G. As shown, the result is new pairings of UAVs/drones (1, 4), (2, 3), (5, 8), and (6, 7). Another counter-rotation of each subgroup results in pairings (2, 4) and (1, 3), as indicated by arrow H, as well as pairings (6, 8), and (5, 7) as indicated by arrow I. The method 50 then proceeds to block B64.

At block B64, the method 50 includes determining whether the next counter-rotation would result in a duplicate UAV pair 12P. This may entail detecting the duplicate UAV pair 12P or other adjacent sensor platform pair in other embodiments, with the duplicate UAV pair 12P/adjacent sensor platform pair being one for which the sensor-specific identification keys were previously exchanged. The method 50 repeats block B62 when a duplicate UAV pair 12P would not result. Otherwise, the method 50 proceeds to block B66.

Block B66 entails exchanging unique identifying keys of the final UAV pairs 12P, the identify of which corresponds to the UAVs 12 situated in the inner and outer quasi-circular arrangements. In the example of FIG. 5, for instance, as the radially innermost UAVs 12 are numbered (3) and (4) and the outermost UAVs 12 are numbered (1) and (2), block B66 includes pairing the UAVs (3, 4) and (1, 2), as respectively indicated by arrow J and arrow K. The same process is performed for the inner grouping of UAVs 12, i.e., (7, 8), and the outer grouping (5, 6) in order to pair the UAVs (7, 8) and (5, 6) and exchange the above-noted encrypted identification keys, as indicated by arrows L and M, respectively. Thus, in response the repositioning conducted in blocks B56-B62, the method 50 includes progressively exchanging the sensor-specific identification keys until each UAV 12 of the UAV swarm 10 has exchanged a respective sensor-specific identification key with every other UAV 12 in the UAV swarm 10, thereby initializing the above-noted web of trust.

As will be appreciated by those skilled in the art in view of the foregoing disclosure, aspects of the present method 50 described above include controlling flight operations of the aerial drone or UAV swarm 10 of FIG. 1 in real-time by executing a set of instructions embodying the method 50. This occurs using a respective CPU 34 of each one of the UAVs 12, with such hardware depicted schematically in FIG. 2. In this manner, the method 50 may include autonomously controlling a flight operation of the UAV swarm 10, such that the UAV swarm 10 functions as a collective unit.

Controlling a flight operation of the UAV swarm 10 in any of the preceding logic blocks of method 50 may include directing the flight operation of the UAV swarm 10 from the base station 22 of FIG. 1 in real-time, e.g., using a secure encrypted or unencrypted radio communication link or a secure optical communication link, with the need for encryption in a given instance being dependent upon the operating environment and application. Once the method 50 is complete, operational control of the UAV swarm 10 may be in accordance with other algorithms not described herein, possibly with in-the-loop direction from the aircraft 16, the base station 22, or both.

As will be appreciated, the UAV swarm 10 once initialized in accordance with the present method 50 may be used to autonomously perform a myriad of possible mission tasks. Beyond "trusted wingman" type missions in which the UAVs 12 of the UAV swarm 10 fly in close coordination with the aircraft 16, with each UAV 12 performing its own designated subtasks within the scope of a broader mission, the UAV swarm initialized as a web of trust as set forth herein may be used to support a wide range of beneficial missions.

By way of example and not limitation, representative mission tasks include package delivery operations in which the UAVs 12 of the UAV swarm 10 collectively fly down to a location on the ground surface 20 of FIG. 1 to deliver packages or mail to different addresses, then return to the aircraft 16 or land on the ground surface 20 at a designated landing site. Alternatively, the UAV swarm 10 could collectively perform an aerial light display, with the constituent UAVs 12 each equipped with lights and configured to fly as part of an ensemble during such a performance. These and other missions require secure encrypted communications in real-time between the various UAVs 12 constituting the UAV swarm 10 of FIG. 1, which in turn requires verification of every individual platform-specific identification key in the UAV swarm. The secure exchange of such keys when initializing the web of trust is thus enabled via execution of the method 50 as set forth herein.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method for initializing a spatial web of trust for a sensor platform array, the method comprising:
    arranging the sensor platform array in multiple sensor groups within a restricted workspace, such that adjacent sensor platform pairs are formed within a close-field range from adjacent corresponding sensor platforms of the multiple sensor groups;
    exchanging sensor-specific identification keys between the adjacent sensor platform pairs using respective transceivers of the adjacent sensor platform pairs;
    progressively repositioning the multiple sensor groups to form unique adjacent sensor platform pairs within the close-field range; and
    in response to the repositioning, progressively exchanging the sensor-specific identification keys between the unique adjacent sensor platform pairs until each sensor platform of the sensor platform array has exchanged a respective one of the sensor-specific identification keys with every other sensor platform in the sensor platform array, thereby initializing the spatial web of trust.

2. The method of claim 1, wherein the sensor platform is a drone, and wherein the sensor platform array constitutes a drone swarm.

3. The method of claim 2, wherein the drone is an unmanned aerial vehicle (UAV), and wherein the drone swarm is a UAV swarm including a plurality of UAVs.

4. The method of claim 3, wherein the restricted workspace is a three-dimensional airspace, and wherein repositioning the multiple sensor groups includes controlling a flight operation of the UAV swarm within the three-dimensional airspace.

5. The method of claim 4, wherein controlling the flight operation of the UAV swarm includes executing a set of instructions using a respective processor of each of the plurality of UAVs of the UAV swarm to autonomously control the flight operation of the UAV swarm.

6. The method of claim 4, wherein controlling the flight operation of the UAV swarm includes directing the flight operation of the UAV swarm from a base station in real-time using a communications link.

7. The method of claim 1, wherein arranging the sensor platform array within the restricted workspace includes arranging each of the multiple sensor groups around a respective perimeter of separate quasi-circular formations, and wherein progressively repositioning the multiple sensor groups includes:
    counter-rotating the multiple sensor groups around the respective perimeters to sequentially form the unique adjacent sensor platform pairs;
    detecting, as a duplicate adjacent sensor platform pair, a pair of the sensor platforms for which the sensor-specific identification keys were previously exchanged; and
    subdividing and counter-rotating each of the multiple sensor groups in response to detecting the duplicate adjacent sensor platform pair.

8. The method of claim 7, wherein arranging the sensor platforms of each of the multiple sensor groups around the respective perimeter of the separate quasi-circular formations includes arranging the sensor platforms on different turntables, and wherein repositioning the multiple sensor groups includes counter-rotating the turntables.

9. The method of claim 8, further comprising:
    detecting a completed exchange of the sensor-specific identification keys between the respective sensor platforms of the adjacent sensor platform pair, wherein counter-rotating the turntables occurs automatically via an electronic control unit in response to the completed exchange.

10. The method of claim 1, wherein the range is less than about 10 meters (m), and wherein the restricted workspace is about 20 m×20 m×20 m or less.

11. A method for initializing a spatial web of trust for an autonomous unmanned aerial vehicle (UAV) swarm, the method comprising:
    arranging the UAV swarm in multiple UAV groups within a restricted airspace, such that adjacent UAV pairs are formed from a corresponding UAV of the multiple UAV groups within a close-field range;
    exchanging UAV-specific identification keys between respective UAVs of the adjacent UAV pairs within the close-field range using transceivers of the respective UAVs, the transceivers being at least one of radio transceivers or optical transceivers;

progressively repositioning the multiple UAV groups to form unique adjacent UAV pairs within the close-field range, including controlling a flight operation of the UAV swarm; and in response to the repositioning, progressively exchanging the UAV-specific identification keys until each UAV of the UAV swarm has exchanged a respective one of the UAV-specific identification keys with every other UAV in the UAV swarm, thereby initializing the spatial web of trust.

12. The method of claim 11, wherein arranging the UAV swarm within the restricted airspace includes deploying the UAV swarm from an airborne base station.

13. The method of claim 12, wherein controlling the flight operation of the UAV swarm includes using a communications link between the airborne base station and the UAV swarm.

14. The method of claim 11, wherein controlling the flight operation of the UAV swarm includes executing a set of local instructions using a respective processor of each of the respective UAVs to autonomously control the flight operation.

15. The method of claim 11, wherein controlling the flight operation of the UAV swarm includes transmitting flight control instructions to the UAV swarm from a terrestrial base station over a ground-to-air communications link.

16. The method of claim 11, wherein arranging the UAV swarm within the restricted airspace includes arranging UAVs of each of the multiple UAV groups around respective perimeters of separate quasi-circular formations, and wherein repositioning the UAV groups includes:

counter-rotating the multiple UAV groups around the respective perimeters to sequentially form the unique adjacent UAV pairs;

detecting, as a duplicate adjacent UAV pair, a pair of the UAVs for which the UAV-specific identification keys were previously exchanged; and subdividing and counter-rotating each of the multiple UAV groups in response to detecting the duplicate adjacent UAV pair.

17. The method of claim 11, wherein the close-field range is less than about 50 meters (m), and wherein the restricted airspace is less than about 100 m×100 m×100 m or less.

18. A system for initializing a spatial web of trust for an autonomous unmanned aerial vehicle (UAV) swarm, the system comprising:

a base station; and a UAV swarm in communication with the base station over an encrypted communications link, wherein each respective UAV of the UAV swarm includes a central processing unit (CPU), a sensor suite, and memory on which is recorded instructions, wherein execution of the instructions by the CPU, in response to an initiation signal from the base station, causes:

autonomous arranging of multiple autonomous UAV groups of the UAV swarm within a restricted airspace, such that an adjacent UAV pair is formed from a corresponding UAV of each respective one of the multiple autonomous UAV groups within a close-field range;

exchanging of UAV-specific identification keys between respective UAVs of the adjacent UAV pair within the close-field range, including using transceivers of the respective UAVs, the transceivers being at least one of radio transceivers or optical transceivers;

progressive repositioning of the multiple autonomous UAV groups, via control of a flight operation of the UAV swarm, to form unique adjacent UAV pairs within the close-field range, wherein the control of the flight operation is at least one of autonomous control or using the encrypted communications link with the base station; and in response to the progressive repositioning of the multiple autonomous UAV groups, progressively exchanging of the UAV-specific identification keys until each UAV of the UAV swarm has exchanged a respective one of the UAV-specific identification keys with every other UAV in the UAV swarm, thereby initializing the spatial web of trust.

19. The system of claim 18, wherein the base station is an airborne base station.

20. The system of claim 18, wherein the execution of the instructions by the CPU causes:

arranging of the UAVs of each of the multiple autonomous UAV groups around a respective perimeter of separate quasi-circular formations;

autonomous counter-rotation of the multiple autonomous UAV groups around the respective perimeters to sequentially form the unique adjacent UAV pairs;

detecting, as a duplicate adjacent UAV pair, a pair of the sensor platforms for which the UAV-specific identification keys were previously exchanged; and subdividing and counter-rotating each of the multiple autonomous UAV groups in response to detecting the duplicate adjacent UAV pair.

* * * * *